United States Patent [19]

Realini et al.

[11] 4,114,706
[45] Sep. 19, 1978

[54] ELECTRICAL WEIGHING APPARATUS

[75] Inventors: Enrico Realini, Uster; Werner Langenegger, Volketswil, both of Switzerland

[73] Assignee: Mettler Instrumente AG, Zurich, Switzerland

[21] Appl. No.: 796,043

[22] Filed: May 11, 1977

[30] Foreign Application Priority Data

Jun. 1, 1976 [CH] Switzerland ............... 6851/76

[51] Int. Cl.² .................. G01G 19/22; G01G 13/14
[52] U.S. Cl. ............................ 177/70; 177/165
[58] Field of Search ............. 177/70, 165, 210 FP, 177/DIG. 3

[56] References Cited

U.S. PATENT DOCUMENTS

| | | | |
|---|---|---|---|
| 3,662,846 | 5/1972 | Sandusky et al. | 177/70 |
| 3,684,875 | 8/1972 | Smith et al. | 177/165 UX |
| 3,853,267 | 12/1974 | Cadwell et al. | 177/165 X |
| 4,015,677 | 4/1977 | Silva et al. | 177/165 |

Primary Examiner—George H. Miller, Jr.
Attorney, Agent, or Firm—Lawrence E. Laubscher

[57] ABSTRACT

Electrical weighing apparatus is disclosed for weighing load components added successively to a load receiver, including a transducer for producing pulses the number of which corresponds with the weight applied to the load receiver, a counter for counting the pulses, a first storage device associated with the counter for storing counts corresponding to the receiver dead-load and containing tare weights, and a display device for displaying the difference between the counts of the counter and the first storage device, characterized by the provision of a second storage device for storing at least those counts corresponding to the weight of one or more components added to the load receiver. In one embodiment, a pair of counters are provided each having its own storage device, and in other embodiments, a single counter is provided in conjunction with a pair of selectively operable storage devices.

11 Claims, 5 Drawing Figures

ELECTRICAL WEIGHING APPARATUS

BRIEF DESCRIPTION OF THE PRIOR ART

Electrical weighing systems of the electromagnetic load compensation type are well known in the patented prior art, as evidenced by the patents to Baumgartner U.S. Pat. No. 3,677,357, Strobel U.S. Pat. No. 3,688,854, Kunz U.S. Pat. Nos. 3,786,678 and 3,786,883, Allenspach U.S. Pat. No. 3,786,884, Strobel et al U.S. Pat. No. 3,789,937, and Bauman et al U.S. Pat. Nos. 3,816,156 and 3,872,936, among others.

Weighing scales of this kind can, for example, be electromagnetically compensated scales, where the force effect of a current, which flows through a coil in a permanent magnet field, compensates for weighing load (and possibly the dead load of the receiver means), and where the current, in balance, is a measure of the load. The current is digitalized via a digital voltmeter or by means of the pulse duration modulation method, and is indicated in units of weight. The use of tare count storage means in such systems is disclosed in the patents to Kunz U.S. Pat. No. 3,786,883, Allenspach U.S. Pat. No. 3,786,884 and Utzinger et al U.S. Pat. No. 3,860,077.

In another type of weighing apparatus illustrated by the patents to Meier U.S. Pat. Nos. 3,897,681 and 3,963,082, the converter comprises one or more laterally oscillating strings whose oscillation frequency, depending upon the load, is counted and evaluated for the digital representation of the weighing results. The above mentioned storage unit here serves for digital taring, that is to say, after the determination of the tare weight, the result is stored and is deducted during a subsequent (gross) weighing operation, so that the net result can be indicated. Depending upon the design of the scale, a portion of the scale weight itself (for example, the scale dish and the scale dish carrier) can be compensated as dead load, alone, or together with the tare, prior to the actual weighing.

One frequently faces the task of estabilishing mixtures of several components, in the same vessel, which components, however, must be weighed individually. In this regard, after taring (in which the indicator is always on zero), the first component is weighed, the instrument is tared again, the next component is added, and so forth. If after completion of the weighing operation, it should be desired to perform a check, for example, to make sure that all components were included in the weighing, then, of course, the total weight can be indicated (with negative sign) through renewed taring after weighing in the last component and subsequent removal of the vessel from the scale. In order to get the total for the components, that is to say, the total weight of all components weighed in, one must therefore deduct the previously noted tare value from the total weight. In other words, the scale user must take notes and perform calculations. This has proven to be bothersome and unsatisfactory considering the present level of operating comfort for modern scales and, besides, this procedure is subject to errors.

SUMMARY OF THE INVENTION

The present invention relates to an electric weighing scale, comprising a load support, a transducer cooperating with it for periodically supplying a number of electrical impulses proportional to the weight, and display means for presenting a digital illustration of the weighing result, with a pulse counter and a storage unit for the registration of a weighing result.

The purpose of the invention is to meet the need for a scale of the kind mentioned initially, which as desired, also determines the total of the components involved. This problem is solved according to the invention in that the indicating means contains another storage unit and that there is provided a control, connected with external operating means, by means of which one can control the cooperation between the counter and a selected storage unit or between the counter and both storage units. The additional storage unit here, so to speak, likewise performs a taring function.

The invention furthermore concerns a method for the digital illustration of net weighing results on an electrical scale which periodically supplies a number of electrical pulses proportional to the weight, by comparing the stored results of a prior weighing operation with a new result and by indicating the difference, said procedure being characterized by the fact that, for the determination of the particular last component out of several components weighed in succession, the particular new result is compared with the content of a first storage unit and whereas, for the determination of the component total, the new result is compared with the content of a second storage unit.

Accordingly, a primary object of the present invention is to provide an improved weighing apparatus including load receiver means, transducer means for producing a series of pulses the number of which corresponds with the weight applied to the load receiver means, pulse counter means for continuously counting the number of pulses produced by the transducer means, first storage means for storing the count of the counter means at a given time, and display means for displaying the count of the counter means, in combination with second storage means for also storing the count of the counter means at any given time. The first and second storage means are selectively operable to subtract from the counter means at any given time the count contained in the storage means, respectively.

In accordance with one embodiment of the invention, the two storage units are identical. Preferably, a separate pulse counter is associated here with each storage unit (whereby the inputs of both counters are connected in parallel to the pulse-supplying outut of the converter) and there is futhermore provided a two-way changeover switch which can be activated via external operating means and which alternatingly connects the output of one or the other counter with an indication device, and finally there are provided two complementary integrated circuits which each contain one of the counters and one of the storage means, respectively. This design is particularly practical when highly-integrated circuits are used for larger series of identical scales because it is then possible, with a comparatively minor effort, to convert scales with only one conventional taring device essentially only by supplementing a second equally highly-integrated circuit so that one may produce the weighing apparatus with the formation of the component total according to the invention.

The indicating means is preferably associated only with a single indicating or display device. This design makes it possible to keep the expenditure small and takes into account the fact that normally, only one indication is needed at the same time (for example, component weight, or component total).

In another embodiment of the invention, at least one of the two storage units is a part of a computer chip. According to a modified embodiment, at least one of the two storage units can be a part of a microcomputer. Although this solution reveals considerable advantages regarding additional functions to be performed by the microcomputer, one must nevertheless take into account the programming costs which will be significant here.

The external operating elements for example can comprise two identical keyboard keys which in each case can be operated in two directions. This version contains advantages in terms of the reduced number of miscellaneous structural elements, and moreover, one can thus reduce the number of operating elements to a minimum. In another preferred version, the operating elements comprise a key, which can be operated in two directions, and which serves to trigger the on-off-tare functions, together with a pair of additional keys each of which has a shape different from the first key, and which are used to trigger the zero-setting and component total indication functions, respectively. The latter variant offers the advantage that different types of functions are more clearly separated and that operating errors are thus more easily avoided.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
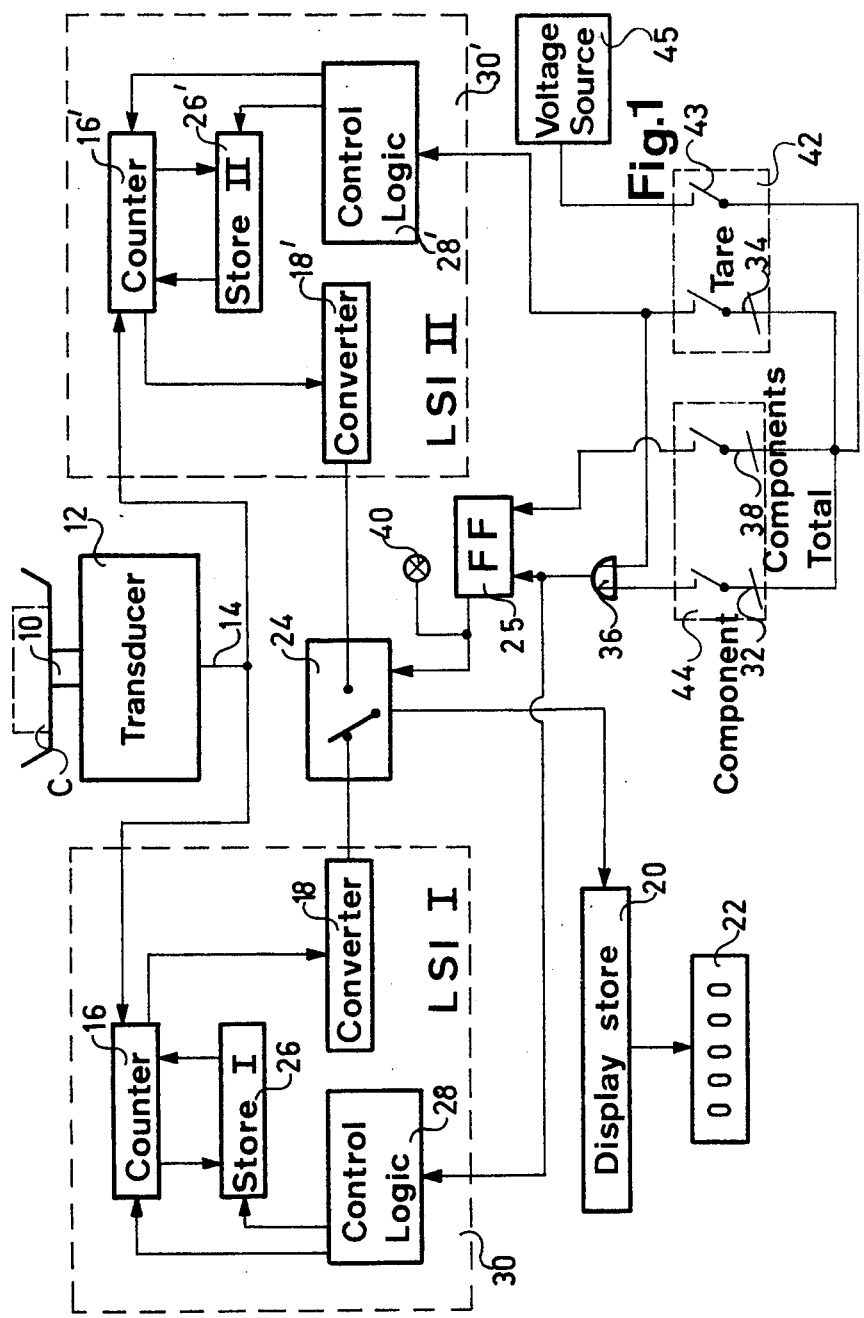
FIG. 1 is an electrical block diagram of a first embodiment of the invention.
Figure 4:
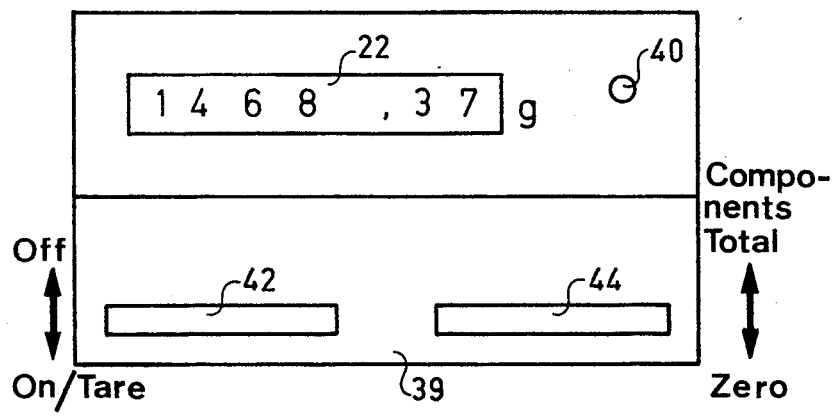
FIG. 4 is a front view of the face plate of a weighing apparatus corresponding to the system of FIG. 1.

Referring first more particularly to the embodiment of FIGS. 1 and 4, the weighing apparatus of the present invention includes a movable load receiver means 10 having a weighing pan for receiving a container C into which the components to be weighed are introduced. Transducer means 12 is operable as a function of the displacement of the load receiver means 10 to produce pulses the number of which is proportional to the load applied to the load receiver means 10. In the illustrated embodiment, the weighing apparatus is of the electromagnetic compensation type in which an electromagnetic force is produced for returning the load receiver means to an initial no-load position, the compensation current which is supplied to the compensation coil being in the form of pulses of load dependent duration, the duration of which is counted high frequency counting pulses (as disclosed for example in the Allenspach U.S. Pat. No. 3,786,884).

The counting pulses produced by transducer 12 are supplied to a pair of counters 16 and 16' having associated therewith conventional count storage means 26 and 26', respectively. The transfer of counts between the counters and their associated count store means is controlled by conventional control logic means 28 and 28'. Counts from the counter 16 are supplied to the display storage means 20 having a visual readout 22 via code converter means 18 and a two-position switch 24. Similarly, the count of counter means 16' is supplied to display store 20 via code converter means 18' and the two-position switch 24. The switch 24 is controlled by a flip-flop device 25 having a pair of input terminals. A voltage signal from voltage source 45 is applied to one input terminal of flip-flop 25 via on-off switch 43, tare switch 34 and OR gate 36, which voltage signal is also applied to both control logic means 28 and 28'. A "component" voltage signal from source 45 is supplied to the first control terminal of flip-flop device 25 and also to control logic 28 via component switch 32 and OR gate 36. A "components total" signal is supplied to the second control input terminal of flip-flop device 25 via components total switch 38. Preferably, the counter 16, storage means 26, control logic means 28 and code converter means 18 are formed as a single integrated circuit 30, and the complementary counter 16', count storage means 26', control logic means 28', and code converter means 18' are formed as a second integrated circuit 30'.

As shown in FIG. 4, the face plate of the weighing apparatus is provided with the readout means 22, and a control lamp 40 that indicates the condition of flip-flop device 25. A key 42 is movable between "Off" and "On" positions to operate the on-off switch 43, and when the key is in the "On" position, it may be depressed to activate the tare switch 34. Similarly, a second key 44 is provided that is movable between a "Zero" position for operating component switch 32, and a "Components Total" position for operating the components total switch 38.

Referring again to FIG. 1, it will be seen that the two integrated circuits 30 and 30' are always connected with the transducer means 12, but only one of the integrated circuits is connected at any given time by switch 24 with the display store means 20. The counter and count storage means associated therewith are so controlled by the control logic means 28 that the difference between the count in counter means 16, 16' and the count in the associated count storage means 26, 26' is supplied to the display storage means 20. The particular total weight is stored in storage unit 26 in case of pressure upon key 44, in other words, for example, the sum of the deadload, the container tare, and the components weighed in so far. In storage unit 26' the total weight which is present at the moment key 42 is depressed (that is to say, during the pressing of key 42 after weighing the empty vessel) i.e., the sum of the deadload and the container tare is stored. At the output of integrated circuit LSI I 30, there is available the weight of the last component weighed in, whereas at the output of LSI II 30', there appears the total weight of all components weighed in. In order to get the total reading, key 44 is lifted to activate components total switch 38 to set the flip-flop 25. As a result, the output of LSI II 30' is connected with the indication means 20, 22 and the control lamp 40 lights up. By pressing one of the keys 44 (components) or 42 (tare), or also by once again lifting key 44 (components total), control lamp 40 can be made to go out and switch 24 is again returned to the normal position, that is to say, the output of the LSI I 30 once again leads to the indication means. Pressure on tare key 42 results in the fact that the reading of both counters 16 and 16' is taken over into the particular storage unit 26 and 26', respectively. As a result, after taring the container, the reading is likewise on zero, which is necessary for weighing in the first component.

OPERATION

Assume that the total weight is to be determined of two components added in succession to a container.

With the load receiver means 10 in an empty condition, key 42 is moved from the "off" position to the "on" position to close switch 43, and is depressed to close tare switch 34, whereupon after a delay of about 1.5 seconds, a count corresponding to the deadload weight of the receiver is stored in both storage means 26 and 26', and the reading of display device 22 is zero. The empty container is then placed on the load receiver means 10, whereupon key 42 is again depressed to cause the tare weight count to be also stored in the storage means 26 and 26', and again the display 22 reads zero. The storage means 26 and 26' now each contain a count equal to the deadload weight of the receiver plus the weight of the container. The first component is then added to the container, and the reading of the counter 16, minus the count of the storage means 26, is displayed on display device 22, thereby affording an accurate reading of the weight of the first component. Key 44 is then operated to close component switch 32, whereupon the count from counter 16 (corresponding to the weight of the first component) is also stored in storage means 26. The second component is now added to the container, whereupon the count of the counter 16, minus the total count in the storage means 26 (i.e., deadload, tare and first component counts), is displayed on display means 22, thereby indicating the weight of the second component. Key 44 is now operated to close components total switch 38, whereupon flip-flop means 25 causes switch 24 to operate to cause converter 18' of the other integrated circuit 30' to be connected to display store 20 and display device 22. Thus the total count of counter 16' (which has continuously been supplied with pulses from transducer 12 during the time the first and second components were added to the container), minus the deadload and container tare counts stored in storage means 26', is supplied to the display storage means 20 to display the total weight value of the components on the display means 22.

For further control purposes, one can also read off the total weight as well as the tare weight (container tare) which was indicated after the second operation. For this purpose the following sequence is used:

(a) Press key 44 to operate the component switch;

(b) Remove the material to be weighed (whereupon the gross weight appears with negative sign); and (c) Lift key 44 to operate the components total switch (whereupon the container tare appears with negative sign).

The components total reading is erased again by activating one of the three switches 34, 32, 38 (press key 42, press or lift key 44). Just exactly which operation is performed to leave the components total indication will be determined by the particular type of use. If, when weighing in many components, it should be desired to check on a subtotal, then the components total reading afterward is erased either by lifting key 44 (the last-weight-in component is then indicated once more) or if key 44 is pressed to close the components switch, then the zero reading shows up and one can weigh in the next following component. But if the components total reading happens to be a components total sum, then, for the following weighing-in operation, the empty container is placed on the scale, and the components total reading is left by pressing key 42 to close the tare switch and at the same time the new container tare is recorded.

Figure 2:
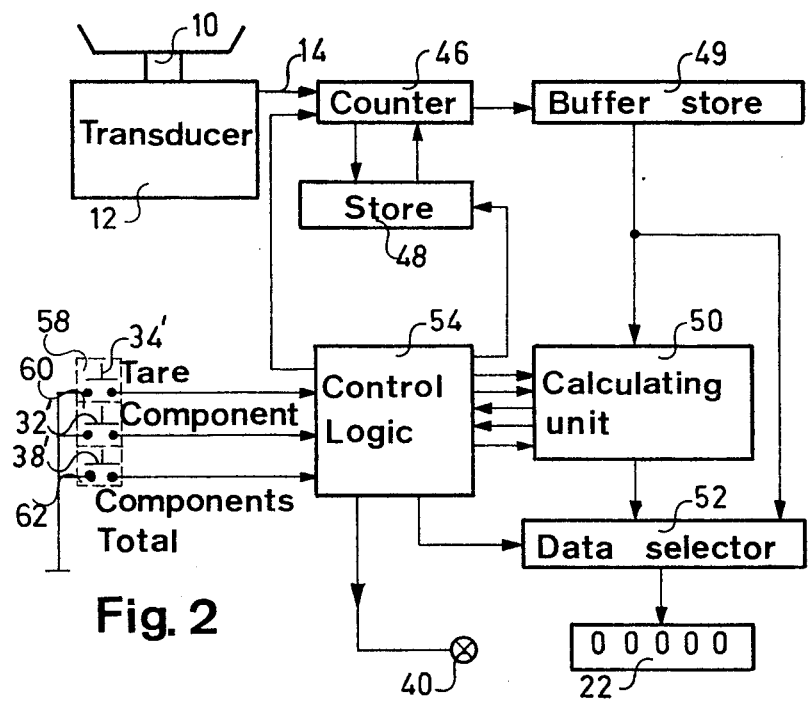
FIGS. 2 and 3 are block diagrams of second and third embodiments of the invention, respectively.
Figure 5:
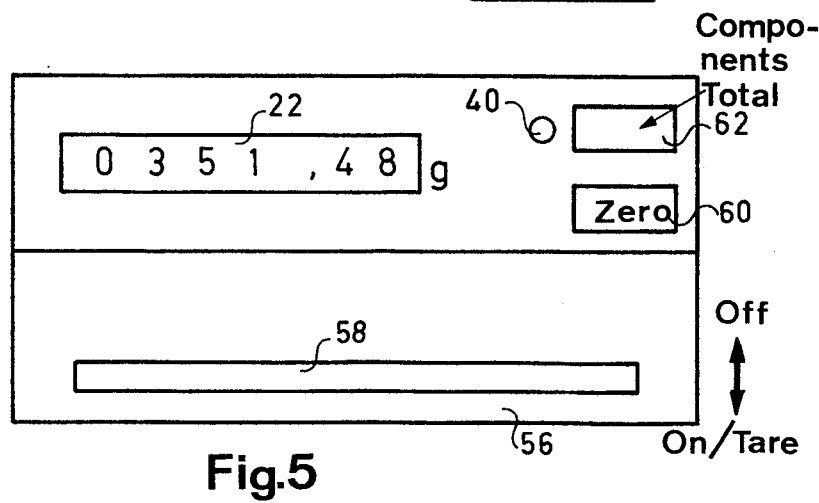
FIG. 5 is a front view of the face plate of a weighing apparatus corresponding to the embodiments of FIGS. 2 and 3.

Referring now to the embodiment of FIGS. 2 and 5, as distinguished from Example I, where two identical LSI's are being used, a structure is provided which is made up of individual parts using a conventional computer module, for example, a commercially available pocket calculator unit.

Here, transducer 12 via line 14 supplies pulses to only one counter 46 with which is associated a first storage unit 48. From counter 46, the pulse sums are supplied to a buffer storage unit 49 from which they are supplied to a calculating unit 50 and, in parallel to this, to a data selector 52. Three pulse switches 34', 32', and 38' trigger the functions of tare, components, and components total, respectively. The control signals supplied via these switches act upon a control logic 54 which, on the one hand, controls the interplay between counter 46 and storage unit 48 and, on the other hand, the operation of the calculating unit 50 and the data selector 52.

FIG. 5 illustrates a front plate 56 for this version. In addition to the display 22 and the control lamp 40, a combined key 58 is provided which, on the one hand, activates a power supply switch (not shown), and on the other hand, during the "taring" function, the tare switch 34'. Separate pressure keys 60 and 62 control the operation of component switch 32' and components total switch 38', respectively.

In the operation of this embodiment, key 58 is operated to turn on the weighing apparatus, and tare switch 34' is operated to cause a count corresponding to receiver deadload to be stored in the storage means 48, whereupon no pulses reach the buffer storage unit 49, and the reading on display device 22 is zero. An empty container is placed on the weighing scale, whereupon the container tare pulses (container weight minus deadload) are supplied to data selector 52 via buffer store 49, so that container tare is displayed by display means 22. Key 58 is operated to close tare switch 34', thereby to transfer tare weight into storage unit 48 and reset to zero the computation and storage register in calculating unit 50. The buffer storage unit 49 again contains a zero value, as does the data selector 52 and display means 22. The first component is added to the empty container, and its weight signal is supplied to display means 22 via buffer storage unit 49 and data selector 52. Component key 60 is operated to close switch 32', whereupon storage unit 48 receives a count corresponding to new total weight, and the weight of the first component is placed in the adding means of the calculating unit 50 via buffer storage unit 49. Consequently, buffer storage unit 49 contains a count of zero, and the reading of display device 22 is zero.

The second component is then added to the container, and the weight indication thereof is supplied to data selector 52 and display 22 via buffer store 49. Component key 60 is operated to cause storage unit 48 to receive the new total weight, and the adding means of the calculating unit 50 now contains the sum of the two component weights. The components total key 62 is now operated to close switch 38', whereupon the data selector 52 is switched around and passes the content of the adding mechanism on to the read-out means 22 to display the total components weight, the control lamp 40 being illuminated at this time.

In order to be able to erase the components total reading again, one of the three keys 60 ("component"), 58 ("tare"), or 62 ("components total") is operated.

In the above example, storage unit 48 thus contains the tare value (and the deadload), as well as the net weights from the earlier component weighing operations, while the calculation chip merely stores the component weights.

Figure 3:
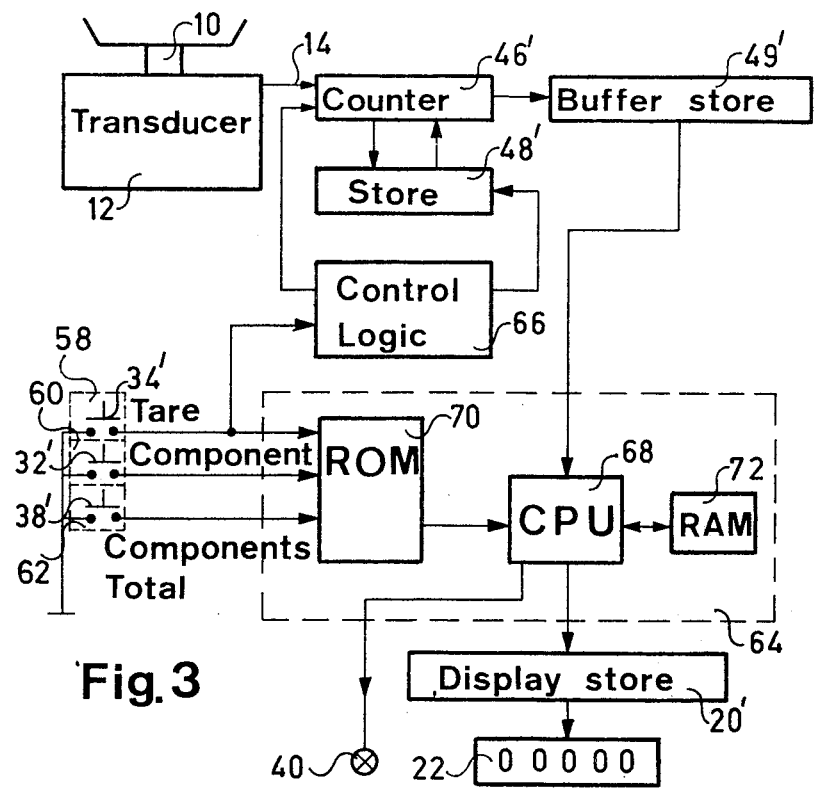

Referring now to the embodiment of FIG. 3, which is generally similar to the embodiment of FIG. 2 a microcomputer 64 is provided in place of the calculating unit of FIG. 2. The presettable counter 46' and storage unit 48' each receive commands from a control logic 66. Via a buffer storage unit 49', the pulse sums are moved from counter 46' to the microprocessor (CPU) 68 of the microcomputer 64. Buffer storage unit 49' is required because of the differing working speeds of counter 46', storage unit 48', and control logic, 66, on the one hand, and microcomputer 64, on the other hand. Three switches 34' ("tare"), 32' ("component"), and 38' ("components total") start the corresponding functions through control signals going to a fixed-value read-only memory storage unit 70 and to control logic 55, respectively. A random access memory, (RAM) 72 serves as result storage unit in microcomputer 64.

The external operating means of FIG. 5 are used to control the system of FIG. 3.

In operation, key 58 is turned on to activate the weighing apparatus, whereupon the simultaneously operated tare switch (after a time delay corresponding to the oscillation period) causes the deadload to be transferred from counter 46' into storage means 48'. The buffer storage device 49' receives no further pulses, and the same command sets the RAM 72 and the display means 22 on zero. An empty container is then placed on the load receiver means, whereupon the container tare (total weight minus deadload) is supplied from counter 46' to the microprocessor 68 via buffer storage means 49'. The microprocessor 68 continuously forms the difference between the contents of buffer storage unit 49' and RAM 72 and passes them on to the reading indication storage unit 20'. Because the content of RAM 72 is zero, the container tare is thus indicated. Key 58 is operated to close tare switch 34', whereupon the preceding measurement value (container tare plus deadload) is supplied into the storage unit 48', and the RAM 72 is set on zero. The counter output, and thus also the display indication, are once again zero. The first component is then added to the container, and its weight is indicated via buffer storage unit 49' and CPU 68. Key 60' is operated to close component switch 32', and the content of buffer storage unit 49' is supplied to RAM 72 via CPU 68, the reading indication storage unit 20' once again being zero (difference from the contents of buffer storage unit 49' and RAM 72). After the second component is added, at the counter output 46' the total of both components is obtained which is supplied to buffer storage unit 49'. CPU 68 again forms the difference by deducting the RAM content (weight of first component) so that the weight of the second component is indicated on the display means. Components total key 62 is then operated to close switch 62, and thereby cause the content of buffer storage unit 49' to be transmitted, via CPU 68, directly to reading indication storage unit 20', whereby the components total is indicated.

In the above example, only the tare (container tare pulse deadload) is stored in container 48'; at the output of counter 46', in each case there is available the components total.

It is understood of course that the above examples represent a large number of modifications of the basic idea behind the invention. Thus the association of operating elements according to FIGS. 4 and 5 with the individual examples or variants thereof is quite arbitrary and can basically be selected and modified according to such viewpoints as, for example, operating comfort. In contrast to the examples shown, the entire circuit can be made up of individual logic structural elements, although this may seem uneconomical considering the current state of the art (also in spite of the possible saving of a counter in comparison to the first embodiment). The third embodiment may be so varied that the functions of counter 46', storage unit 48', and control logic 66 would be taken over by the microcomputer; in this way it would be more economical to produce this particular model. The variation involving the microcomputer is generally of special interest when additional auxiliary or control functions play a role which can be implemented in a relatively simple manner through corresponding programming (input of required components weights with an indication of the difference with respect to the actual value, etc.). If a correspondingly greater expenditure is permitted, there can also be provided at least one additional readout in order, for example, to show simultaneously the gross and net results. As a counter, one could basically use complementary or forward-backward counters. The embodiments of FIGS. 2 and 3 could be provided in the form of a combination of an integrated circuit, as in FIG. 1, with a calculation chip or a microcomputer.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Electrical weighing apparatus, comprising
   (a) load receiver means for receiving a load to be weighed;
   (b) transducer means for producing a number of pulses corresponding to the instantaneous weight of one or more components placed on said load receiver means;
   (c) pulse counter means for continuously counting the number of pulses produced by said transducer means;
   (d) display means for displaying the instantaneous count of said counter means;
   (e) first and second storage means selectively operable to store instantaneous counts of said counter means, respectively; and
   (f) control means for selectively operating said first and second storage means to store certain counts of said counter means, respectively, and to subsequently subtract the stored counts from subsequent pulse counts, respectively, said control means including
      (1) tare switch means (34, 34') operable when the load receiver means is empty for transferring to at least one of said first and second storage means from said counter means a count corresponding to the deadload weight of said load receiver means, said tare switch means also being operable when an empty container is placed on said load receiver means to transfer to at least one of said first and second storage means a count that corresponds with the container tare weight, said storage means being operable after a first component is subsequently introduced into the container to subtract from the counter count a count corresponding to the sum of the deadload and tare weights, whereby the displayed count of said counter means corresponds with the weight of the first component;

(2) component switch means (32, 32') operable after a first component has been introduced into the container for storing in at least one of said first and second storage means a count corresponding to the weight of the first component, said storage means being operable after a second component is added to the container to subtract from the counter count a count corresponding to the sum of the deadload, tare and first component weights, whereby the displayed count of said counter means corresponds with the weight of the second component; and (3) components total switch means (38, 38') for subtracting from the count of said counter means after the addition of the second component to the container a count corresponding to the deadload and tare weights, whereby the displayed count of said counter means is a function of the total weight of the two components.

2. Apparatus as defined in claim 1, wherein said display means comprises a single display device (22).

3. Apparatus as defined in claim 1, wherein said first and second storage means (26, 26') comprise separate units of corresponding construction, respectively.

4. Apparatus as defined in claim 3, wherein said counter means includes first and second counters (16, 16') associated with said first and second storage means, respectively, each of said counters being continuously supplied with pulses from said transducer means;

and further wherein said control means includes condition switch means (24) for alternately connecting said first and second counters with said display means, respectively.

5. Apparatus as defined in claim 4, wherein said condition switch means normally connects said display means with the counter associated with said second storage means, said condition switch being operable by said components total switch to connect said display means with the other counter.

6. Apparatus as defined in claim 5, and further including first key means (42) for operating said tare switch means, and second key means for alternately operating said component switch and said components total switch, respectively.

7. Apparatus as defined in claim 6, and further including a power supply switch for supplying electrical power to said apparatus, said power supply switch being operable by said first key means.

8. Electrical weighing apparatus, comprising
(a) load receiver means for receiving a load to be weighed;
(b) transducer means for producing a number of pulses corresponding to the instantaneous weight of one or more components placed on said load receiver means;
(c) pulse counter means for continuously counting the number of pulses produced by said transducer means;
(d) display means for displaying the instantaneous count of said counter means;
(e) first and second storage means selectively operable to store instantaneous counts of said counter means, respectively, said second storage means being defined by the addition means of an arithmetic calculating module (50); and
(f) control means for selectively operating said first and second storage means to store certain counts of said counter means, respectively, and to subsequently subtract the stored counts from subsequent pulse counts, respectively, said control means including (1) data selector means (52) having a pair of input terminals one of which is connected with the output terminal of said calculating unit, and an output terminal connected with said display means;

(2) buffer store means (49) having an input terminal connected with said counter means, and a pair of output terminals one of which is connected with the input terminal of the calculating module and the other of which is connected with the other input terminal of said data selector means;

(3) control logic means (54) for controlling the operation of said first storage means, said calculating module, and said data selector means;

(4) tare switch means (34') for supplying a signal to said control logic means when said load receiver means is empty to cause said first storage means to store a count corresponding to the deadload of said load receiver means, said tare switch means also being operable when an empty container is placed on said load receiving means to store in said first storage means a count corresponding with container tare weight, whereby when a first component is introduced into the container, a count corresponding to the weight thereof is supplied to said display means via said buffer store means and said data selector means;

(5) components switch means (32') for supplying to said control logic means a signal causing entry into both said first and second storage means a count corresponding to the weight of the first component, whereupon the display indication is returned to zero, said counter means being operable, when the second component is added to the container, to indicate on said display means a count corresponding to the weight of the second component, said component switch then being operable to effect storage of a count corresponding to the weight of the second component into both said first and second storage means; and (6) components total switch means (38') for supplying to said control logic means a signal causing said calculating module to supply to said display means a count corresponding to the sum of the component weights.

9. Apparatus as defined in claim 8, and further including separate key means (58, 60 and 62) for operating said tare switch, said components switch and said components total switch, respectively.

10. Electrical weighing apparatus, comprising
(a) load receiver means for receiving a load to be weighed;
(b) transducer means for producing a number of pulses corresponding to the instantaneous weight of one or more components placed on said load receiver means;
(c) pulse counter means for continuously counting the number of pulses produced by said transducer means;

(d) display means for displaying the instantaneous count of said counter means;

(e) first and second storage means selectively operable to store instantaneous counts of said counter means, respectively, said second storage means comprising random access memory means (72); and (f) control means for selectively operating said first and second storage means to store certain counts of said counter means, respectively, and to subsequently subtract the stored counts from subsequent pulse counts, respectively, said control means including (1) a microcomputer (64) having an output terminal connected with said display means, a second terminal connected with said random access memory means, an input terminal, and a control terminal;

(2) buffer store means (49') having an input terminal connected with said counter means, and an output terminal connected with the microcomputer input terminal;

(3) control logic means (66) for controlling the transfer of counts between said counter means and said first storage means;

(4) read-only memory means (70) for controlling the operation of said microcomputer means;

(5) tare switch means (34') operable when the load receiver means is empty for supplying a signal to the read-only memory means and for operating said control logic means to effect storage of the deadload weight in said first storage means, said tare switch means also being operable when an empty container is placed on the load receiver means to transfer to said first storage means from the computer a count corresponding to the container tare weight, whereby when a first component is introduced into the container, a count corresponding to the weight thereof is displayed by said display means;

(6) component switch means (32') for supplying to the read-only memory means a signal causing the microcomputer to record in the random-access memory means a count corresponding to the weight of the first component, said component switch means being similarly operable when a second component is added to the container to introduce a corresponding second count into said random-access memory means; and (7) components total switch means for supplying to the read-only memory means a signal for operating the microprocessor unit and the random-access memory means to display on said display means a value corresponding to the total weight of the components.

11. Apparatus as defined in claim 10, including a plurality of keys (58, 60 and 62) for selectively operating said tare switch, said component switch and said components total switch, respectively.

* * * * *